United States Patent
Garella et al.

(10) Patent No.: US 10,526,213 B2
(45) Date of Patent: Jan. 7, 2020

(54) PROCESS FOR MAKING A LITHIATED TRANSITION METAL OXIDE

(71) Applicant: BASF SE, Ludwigshafen (DE)

(72) Inventors: Dominik Garella, Wiesloch (DE); Benedikt Kalo, Mannheim (DE)

(73) Assignee: BASF SE, Ludwigshafen (DE)

( * ) Notice: Subject to any disclaimer, the term of this patent is extended or adjusted under 35 U.S.C. 154(b) by 19 days.

(21) Appl. No.: 15/528,554

(22) PCT Filed: Nov. 17, 2015

(86) PCT No.: PCT/EP2015/076741
§ 371 (c)(1),
(2) Date: May 22, 2017

(87) PCT Pub. No.: WO2016/083185
PCT Pub. Date: Jun. 2, 2016

(65) Prior Publication Data
US 2017/0253494 A1  Sep. 7, 2017

(30) Foreign Application Priority Data

Nov. 26, 2014 (EP) .................... 14194991
Sep. 7, 2015 (EP) .................... 15184057

(51) Int. Cl.
| | | |
|---|---|---|
| C01G 53/00 | (2006.01) | |
| C01G 51/00 | (2006.01) | |
| C01G 45/12 | (2006.01) | |
| B01J 6/00 | (2006.01) | |
| B01J 19/02 | (2006.01) | |
| H01M 4/505 | (2010.01) | |
| H01M 4/525 | (2010.01) | |
| H01M 4/02 | (2006.01) | |

(52) U.S. Cl.
CPC ............. *C01G 53/50* (2013.01); *B01J 6/004* (2013.01); *B01J 19/02* (2013.01); *C01G 45/12* (2013.01); *C01G 51/00* (2013.01); *C01G 53/00* (2013.01); *C01G 53/42* (2013.01); *H01M 4/505* (2013.01); *H01M 4/525* (2013.01); *B01J 2219/0263* (2013.01); *C01P 2004/61* (2013.01); *C01P 2006/40* (2013.01); *C01P 2006/80* (2013.01); *H01M 2004/028* (2013.01)

(58) Field of Classification Search
CPC .......... C01G 53/50; C01G 45/12; C01G 1/00; C01G 53/00; C01G 53/42; B01J 6/004; B01J 19/02; H01M 4/505; H01M 4/525
See application file for complete search history.

(56) References Cited

U.S. PATENT DOCUMENTS

| | | | | |
|---|---|---|---|---|
| 2,911,290 | A * | 11/1959 | Graae | ...................... B01J 8/189 |
| | | | | 422/142 |
| 6,875,416 | B1 | 4/2005 | Benz et al. | |
| 8,425,855 | B2 * | 4/2013 | Froehlich | ................. B01J 19/02 |
| | | | | 422/139 |
| 2002/0009645 | A1 | 1/2002 | Shima et al. | |
| 2008/0135802 | A1 | 6/2008 | Saito et al. | |
| 2011/0052484 | A1 | 3/2011 | Krampitz et al. | |

FOREIGN PATENT DOCUMENTS

| | | |
|---|---|---|
| CN | 103 078099 | 5/2013 |
| EP | 1 142 334 A1 | 10/2001 |
| WO | 2012/177833 A2 | 12/2012 |

OTHER PUBLICATIONS

International Preliminary Report on Patentability dated Feb. 25, 2016 in PCT/EP2015/076741.
International Search Report and Written Opinion dated Jan. 14, 2016 in PCT/EP2015/076741.
International Search Report dated Jan. 14, 2016 in PCT/EP2015/076741 filed Nov. 17, 2015.

* cited by examiner

*Primary Examiner* — James A Fiorito
(74) *Attorney, Agent, or Firm* — Oblon, McClelland, Maier & Neustadt, L.L.P.

(57) ABSTRACT

Process for manufacturing a lithiated transition metal oxide, said process comprising the steps of (a) mixing at least one lithium salt and a precursor selected from transition metal oxides, transition metal oxyhydroxides, transition metal hydroxides, and transition metal carbonates, (b) pre-calcining the mixture obtained in step (a) at a temperature in the range of from 300 to 700° C., and (c) calcining the pre-calcined mixture according to step (b) in a multi-stage fluidized bed reactor at a temperature in the range of from 550° C. to 950° C., wherein the temperatures in step (b) and (c) are selected in a way that step (c) is being performed at a temperature higher than that of step (b).

15 Claims, No Drawings

PROCESS FOR MAKING A LITHIATED TRANSITION METAL OXIDE

The present invention is directed towards a process for manufacturing a lithiated transition metal oxide, said process comprising the steps of
(a) mixing at least one lithium salt and a precursor selected from transition metal oxides, transition metal oxyhydroxides, transition metal hydroxides, and transition metal carbonates,
(b) pre-calcining the mixture obtained in step (a) at a temperature in the range of from 300 to 700° C., and
(c) calcining the pre-calcined mixture according to step (b) in a multi-stage fluidized bed reactor at a temperature in the range of from 550° C. to 950° C.,
wherein the temperatures in step (b) and (c) are selected in a way that step (c) is being performed at a temperature higher than that of step (b).

Lithiated transition metal oxides and lithium iron phosphates are currently being used as electrode materials for lithium-ion batteries. Extensive research and developmental work has been performed in the past years to improve properties like charge density, storage capacity, energy, but also other properties like advantageous methods for manufacturing said electrode materials. Such methods should be cost-efficient, environmentally friendly, and easily to be up-scaled.

Various electrode material manufacturing processes performed or under development are essentially two-step processes. In the first step, a so called precursor is being made by co-precipitating the respective transition metals as mixed hydroxide or mixed carbonate. In a second step, said precursor is being mixed with a lithium compound and then subjected to a solid-phase reaction under high temperature. The solid-phase reaction is often being termed calcination in the context of electrode material manufacturing.

In the past, a lot of developmental work has been done on the co-precipitation work. However, the calcination process may also influence the properties of the respective electrode material and the costs of the manufacturing process.

In many embodiments, the calcination step is being performed at temperatures up to 900 or even to 950° C.

Numerous applications disclose the use of a rotary kiln or a roller hearth kiln. The mixture of precursor and lithium compound, however, may cause corrosion especially at the high temperature that is required for calcination. Therefore, only few and very costly materials qualify for the respective rotary kiln. When ceramic materials are being used in order to reduce the corrosion problems it can be observed that the thermal conductivity of ceramic materials is much lower than that of metals. The incomplete heat transfer results in higher heating costs and extended residence time of the material to be calcined.

In WO 2012/177833, calcination in a cascade of two rotary calciners is being suggested. However, the corrosion problems especially in the second rotary calciner remain unsolved.

In a roller hearth kiln process, a mixture of precursor and lithium compound such as lithium carbonate or lithium hydroxide is being placed in a sagger and then moved through a heating zone. This process allows for reduced corrosion problems. However, roller hearth kilns have the disadvantage that the size of saggers is limited. Therefore, up-scaling of a roller hearth kiln-based process causes high investment costs.

It was therefore an objective of the present invention to provide a process for manufacturing lithiated transition metal oxides that can be up-scaled easily and which allows good heat recovery.

Accordingly, the process defined at the outset was found. It is hereinafter also being referred to as inventive process or process according to the (present) invention.

The inventive process can be used as process for manufacturing any lithiated transition metal oxide. The term "lithiated transition metal oxides" hereinafter refers to mixed metal oxides that contain lithium and at least one transition metal such as, but not limited to nickel, cobalt, manganese, and combinations thereof. The stoichiometric ratio of lithium and total transition metal is preferably in the range of from 1.13:0.87 to 1:2. Lithiated transition metal oxides may contain minor amounts of metal cations other than transition metals or lithium, such as barium, calcium or aluminum and combinations thereof. For example, lithium transition metal oxides may contain up to 5 mole-% of Al, referring to their total transition metal content. In one embodiment of the present invention, however, lithiated transition metal oxides contain only traces of metal cations other than transition metals and lithium, for example 0.01 mole-% or less, referring to their total transition metal content.

Lithiated transition metal oxides may, for example, have a layered oxide structure or a spinel structure.

In one embodiment of the present invention, lithiated transition metal oxides are selected from lithiated spinels, lithium nickel-cobalt-aluminum oxides, and lithium metal oxides with a layered structure, also being referred to as layered oxides.

Examples of lithiated transition metal oxides are $LiCoO_2$, $LiMnO_2$, $LiNiO_2$, and compounds of the general formula $Li_{1+x}(Ni_aCo_bMn_cM^1{}_d)_{1-x}O_2$, with $M^1$ being selected from Ca, Al, Ti, Zr, Zn, Mo, V and Fe, the further variables being defined as follows:
x being in the range of from 0.015 to 0.13,
a being in the range of from 0.3 to 0.7,
b being in the range of from zero to 0.35,
c being in the range of from 0.2 to 0.5
d being in the range of from zero to 0.03,
with a+b+c+d=1.

Further examples of lithiated transition metal oxides are those of the general formula $Li_{1+y}M^2{}_{2-y}O_{4-r}$
where r is from zero to 0.4 and y is in the range of from zero to 0.4, and
$M^2$ being selected from one or more metals of groups 3 to 12 of the periodic table, for example Ti, V, Cr, Mn, Fe, Co, Ni, Zn, Mo, with Mn, Co and Ni and combinations therefrom being preferred, and especially from combinations of Ni and Mn. Even more preferred are $LiMn_2O_4$ and $LiNi_{2-t}Mn_tO_4$ with the variable t being in the range of from zero to 1.

Examples of lithium nickel-cobalt-aluminum oxides are compounds of the general formula $Li[Ni_hCo_iAl_j]O_{2+r}$. Typical values for h, i and j are:
h is in the range of from 0.8 to 0.85,
i is in the range of from 0.15 to 0.20, and
j is in the range of from 0.01 to 0.05.
r is in the range of from zero to 0.4.

Preferred lithiated transition metal oxides that can be made according to the process according to the present invention are lithiated spinels and lithium metal oxides with a layered structure.

The process according to the present invention comprises three steps, hereinafter also being referred to as step (a), step (b) and step (c):

(a) mixing at least one lithium salt and a precursor selected from transition metal oxides, transition metal oxyhydroxides, transition metal hydroxides, and transition metal carbonates, transition metal hydroxides and transition metal oxyhydroxides being preferred, (b) pre-calcining the mixture obtained in step (a) at a temperature in the range of from 300 to 700° C., and (c) calcining the pre-calcined mixture according to step (b) in a multi-stage fluidized bed reactor at a temperature in the range of from 550° C. to 950° C.

Step (a), step (b) and step (c) will be described in more detail below.

Step (a) is directed towards mixing of at least two compounds, namely at least one lithium salt and a precursor.

Lithium salts may be selected from lithium oxide, lithium sulfate, lithium acetate, lithium nitrate, lithium peroxide, lithium hydrogen carbonate, and lithium halides, for example lithium fluoride, especially lithium chloride and lithium bromide. Preferred lithium salts are selected from lithium hydroxide, lithium oxide, and lithium carbonate, lithium carbonate being particularly preferred. Step (a) may be directed to mixing said precursor with one lithium salt or with a combination of at least two lithium salts, for example, with a combination of two or three lithium salts. Examples of suitable combinations of two lithium salts are mixtures of lithium oxide and lithium hydroxide, and mixtures of lithium hydroxide and lithium carbonate, and mixtures of lithium carbonate and lithium hydrogen carbonate. An example of a suitable mixture of three lithium salts is a mixture of lithium oxide, lithium hydroxide and lithium carbonate. It is preferred, though, to perform step (a) by mixing a precursor with essentially one lithium salt, wherein "essentially one lithium salt" refers to exactly one lithium salt or a mixture of two or more lithium salts wherein in said mixture one of the salts constitutes at least 95% by weight of the total lithium salts.

Said precursor is selected from transition metal oxides, oxyhydroxides, transition metal hydroxides, and transition metal carbonates, transition metal hydroxides and transition metal oxyhydroxides being preferred.

In one embodiment of the present invention said precursor is selected from oxides, hydroxides, oxyhydroxides and carbonates of one transition metal. Said transition metal is preferably selected from Ni, Mn and Co. In a preferred embodiment of the present invention the precursor is selected from oxides, oxyhydroxides, hydroxides, and carbonates of at least two transition metals, said transition metals being selected from combinations of two out of Ni, Co and Mn.

In one embodiment of the present invention, the precursor is selected from oxides, oxyhydroxides, hydroxides, and carbonates of combinations of Ni, Co and Al.

In one embodiment of the present invention the precursor is selected from oxides, oxyhydroxides, hydroxides, and carbonates of combinations of Ni, Mn, optionally Co and optionally at least one further metal selected from Ca, Al, Ti, Zr, Zn, Mo, V and Fe.

In one embodiment of the present invention the precursor has an average particle diameter (D50) in the range of from 3 to 20 μm, preferably from 5 to 16 μm. The average particle diameter can be determined, e. g., by light scattering. The term average particle diameter refers to the average particle diameter of the precursor employed in step (a). Lithium salt as used in step (a) of the inventive process preferably has an average particle diameter (D50) in the range of from 4 to 7 μm. It may be observed that in many embodiments in steps (a), (b) and especially (c) certain agglomerates are being formed that contain a plurality of particles selected from dried or dehydrated precursor and lithium salt and, optionally, lithiated transition metal oxides. Said agglomerates usually have a diameter greater than the average particle diameter of precursor. Said agglomerates usually behave dynamically, for example, they release particles of dried or dehydrated precursor and/or lithium salt and, if applicable, of lithiated transition metal oxide. At the same time, they incorporate particles of dried or dehydrated precursor and/or lithium salt and, if applicable, of lithiated transition metal oxide.

The stoichiometry of the metals and especially of the transition metals of the precursor is preferably selected from the desired stoichiometry of the respective metals in the lithiated transition metal oxide.

In one embodiment of the present invention the stoichiometry of lithium to total transition metal—or to total metal other than lithium if Al or Ba or Ca are present—is preferably being selected according to the stoichiometry in the respective lithiated transition metal oxide. In another embodiment of the present invention, an excess of lithium salt is being employed, for example in the range of 0.2 to 5 mol-%, referring to the total lithium content, in order to avoid a deficit of lithium due to sublimation or other causes.

Mixing can be performed at various temperatures, and the temperature at which step (a) is being performed is usually not critical. It is possible to perform step (a) at a temperature in the range of from zero to 100° C. or even higher.

In one embodiment of the present invention, step (a) is performed at a temperature in the range of from 10 to 30° C.

Step (a) may be performed at normal pressure.

Step (a) may be performed in conventional mixing apparatuses for mixing solids. In a special embodiment, step (a) is performed in the same vessel as step (b) prior to said step (b).

After having performed step (a) a mixture is obtained.

In step (b), the mixture obtained in step (a) is being pre-calcined at a temperature in the range of from 300 to 700° C. In order to affect such pre-calcination, the mixture obtained according to step (a) is subjected to a temperature in the range of from 300 to 700° C. It is possible to raise the temperature in one step or in more than one steps, for example in two or three steps. It is possible, for example, to raise the temperature to 300 to 350° C., then to maintain the mixture obtained according to step (a) at such temperature, to then raise the temperature to 500 to 600° C., and then to maintain the temperature at the latter temperature followed by raising the temperature to 700° C. in another example, it is possible to raise the temperature to 300 to 350° C., then to maintain the mixture obtained according to step (a) at such temperature, to then raise the temperature to 650 to 700° C., and then to maintain the temperature at the latter temperature. In another embodiment, it is possible to raise the temperature to 350 to 400° C., then to maintain the mixture obtained according to step (a) at such temperature, to then raise the temperature to 550 to 600° C., and then to hold the temperature at the latter temperature followed by raising the temperature to 700° C.

In the context of the present invention, holding the mixture obtained in step (a) at a temperature shall mean that the respective mixture is heat treated at a certain temperature±10° C. over a period of time in the range of from 15 minutes to 5 hours.

In one embodiment of the present invention the mixture obtained in step (a) is being held at at least one certain temperature±5° C. over a period of time in the range of from 15 to 120 minutes.

In one embodiment of the present invention, step (b) is being performed at normal pressure. In other embodiments, step (b) is being performed at a pressure higher than normal pressure, for example up to 10 bar. Normal pressure or elevated pressure up to 1.5 bar is preferred.

In one embodiment of the present invention, step (b) is being performed over a period of time in the range of from 1 hour to 10 hours.

In one embodiment of the present invention step (b) is being performed in a rotary kiln, in a rotary hearth kiln, in a pendulum kiln, in a roller hearth kiln, in a tunnel kiln, in a packed bed reactor, in a fluidized bed reactor, or in a separate zone of a fluidized bed reactor employed for step (c). In a preferred embodiment of the present invention, step (b) is performed in a rotary kiln or in a separate stage of a fluidized bed.

In one embodiment of the present invention, heating during step (b) is being performed at an average rate of from 1 to 5° C./min. In embodiments wherein step (b) is being performed in a separate zone or stage of a fluidized bed the heating occurs faster, because the particles of precursor and lithium salt are directly introduced into the fluidized bed.

In a particularly preferred embodiment of the present invention, step (b) is being performed in a separate stage of a fluidized bed wherein said separate stage has at least the same as and preferably a larger hold-up than the other stages. The term "the other stages" refers to the stages employed in step (c). Said same or preferably larger hold-up is required to overcome the potential stickiness of the particles of the mixture obtained in step (a).

In embodiments of step (b) in which step (b) is being performed as a fluidized bed only a minor portion of the hold-up of a separate stage, for example up to 25%/h, preferably around 1 to 10%/h, is replaced by fresh mixture obtained from step (a). Whenever a lower hold-up or a higher exchange rate is selected the material is too sticky in order to yield stable fluidization.

In one embodiment of step (c), the height of one stage is in the range of from 30 cm to 1 m. The hold-up in step (c) depends on the number of stages and the volume of each stage, for example characterized by height and diameter.

During step (b), in embodiments wherein the precursor is being selected from carbonates, carbonate from the precursor is being partially or completely removed as $CO_2$.

During step (b), in embodiments wherein the precursor is being selected from hydroxides and oxyhydroxides, hydroxide from the precursor is partially or completely being removed as $H_2O$.

After having performed step (b), a mixture is obtained. Such mixture has the temperature of up to 700° C. The mixture so obtained has no or a very low hydroxide content, but it may have a carbonate content of 5% by weight or more.

The apparatus employed in step (b) may be made from steal, with or without protection by ceramic material. In embodiments wherein step (b) is performed in a separate stage or zone of the fluidized bed reactor in which step (c) is performed, said zone may be protected by a ceramic material. Ceramic materials are being described below in more detail.

In step (c), the mixture obtained according to step (b) is calcined in a multi-stage fluidized bed reactor at a temperature in the range of from 550° C. to 950° C.

In steps (b) and (c) the temperatures are selected in a way that step (c) is being performed at a temperature higher than that of step (b), preferably at a temperature that is at least 50° C. higher than the temperature of step (b). In one embodiment, step (b) may be performed at a temperature in the range of from 300 to 500° C. and step (c) at a temperature in the range of from 550 to 950° C. In one embodiment, step (b) is performed at a temperature in the range of from 500 to 600° C. and step (c) is performed at a temperature in the range of from 650 to 950° C. In a further embodiment, step (b) is performed at a temperature in the range of from 600 to 650° C. and step (c) is performed at a temperature in the range of from 700 to 950° C. In a further embodiment, step (b) is performed at a temperature in the range of from 650 to 700° C. and step (c) is performed at a temperature in the range of from 750 to 950° C.

A multi-stage fluidized bed reactor in the context of the present invention encompasses a reactor or a combination of reactors in which in the steady state at least two, preferably at least three, most preferably in the range of from 3 to 20 stages of a fluidized bed exist. Said stages may also be termed as zones. The stages may be arranged horizontally or vertically, preferred is vertically. Different stages are separated from each other through physical provisions, especially through at least one structural measure. Examples of structural measures are perforated plates, perforated boards, and bubble trays (German: Glockenböden).

In one embodiment of the present invention, the different stages of the multi-stage fluidized bed reactor are connected with each other through standpipes. Solid particles can pass the physical provisions that separate the different stages of the fluidized bed from each other, from a higher stage to the stage below. If the level of the fluidized bed on a stage of the multi-stage fluidized bed reactor is exceeding the height of the standpipe due to a solids feed to this level, the fluidized solids may drop into the respective standpipe as long as the level of the respective stage of fluidized bed exceeds the height of the respective standpipe and are thereby transferred to the stage below. In order to avoid short-circuits of a stage, the point where the standpipe of the stage above enters the separate stage of the multi-stage fluidized bed reactor and the point, where the standpipe to stage below is located, should be on opposing sides of the separate stage of the multi-stage fluidized bed reactor.

In one embodiment of the present invention, the average residence time in step (c) is in the range of from one hour to 6 hours, preferably 90 minutes to 4 hours.

In one embodiment of the present invention, the gas inlet temperature in step (c) is ambient temperature. In other embodiments, pre-heated gas is being employed and the gas inlet temperature may be in the range of from 100 to 950° C.

Preferably, the heat in step (c) is introduced at least partially through heating of the wall(s) or other elements of the reactor in which step (c) is being employed.

In one embodiment of the present invention, the gas outlet temperature in step (c) is ambient temperature. In other embodiments, the gas outlet temperature in step (c) is in the range of from 50 to 100° C.

The gas inlet may have a superficial gas velocity in the range of from 5 to 50 cm/s, preferably 20 to 30 cm/s. Said velocity is measured in the fluidized bed and relates to the empty reactor. The average residence time of the gas may be in the range of from less than one second to one minute per stage.

In an preferred embodiment, the superficial gas velocity in the fluidized bed changes with every stage due to the different temperatures of the stages in the steps (b) and (c). The volumetric gas flow rate and the reactor diameter are then selected in a way that the superficial gas velocity is neither below the minimum fluidization velocity too low nor the above the terminal velocity (German: Einzel-Partikel-Austragsgeschwindigkeit). Accordingly a stable fluidization may be achieved.

When the gas leaves the multi-stage fluidized bed reactor, solids may be removed from the gas stream based on gravity through a free-board, or for example by means of a cyclone or preferably by filter candles.

In one embodiment of the present invention the heat in step (c) is at least partially transferred by thermal radiation, especially at temperatures of 500° C. or higher. Said thermal radiation partially occurs through heating through a heating system that may be installed in or close to the wall of the multi-stage bed reactor or in the free space between 2 stages. Said thermal radiation may partially occur through heat exchange among the fluidized particles. The higher the temperature the higher the percentage of heat exchange through thermal radiation.

In one embodiment of the present invention, step (c) is being performed in a multi-stage fluidized bed with in the range of from 3 to 20 stages.

In one embodiment of the present invention, the apparatus wherein step (c) is being performed has a surface made from ceramic material. This refers preferably to the surface that comes into contact with the mixture obtained according to step (b). A surface made from ceramic—or ceramic material—refers to surfaces but not necessarily to the whole wall. It is therefore possible that the wall of said apparatus is from steel coated with a ceramic material. Said surface may also include some or all of the parts that constitute the different stages.

Ceramic materials may be selected from oxides, non-oxides, and composite materials. Examples of oxides suitable as ceramic material for the present invention are alumina and zirconia. Examples of non-oxides suitable as ceramic material for the present invention are borides, nitrides and carbides, especially SiC. Examples of composite materials are particulate reinforced ceramics, fiber reinforced ceramics and combinations of at least one oxide and at least one non-oxide. Preferred examples of composite materials are fiber-reinforced alumina and combinations of alumina and SiC.

After having performed step (c), the material so obtained may be removed from the multi-stage fluid bed reactor by the gas stream.

Further steps may be performed thereafter, for example cooling down the material so obtained, and sieving.

In a special embodiment of the present invention, step (c) of the inventive process is carried out in the presence of a chemically inert particulate material. Such chemically inert particulate material may be added before or during step (b) or—at the latest—after step (b) and before step (c). It is preferred to add such chemically inert particulate material before or during (b) in embodiments in which step (b) is carried out in a separate stage of the fluidized bed or in a separate fluidized bed reactor. It is particularly preferred to add a chemically inert particulate material at the beginning of step (b), thus, before heating to temperatures to 350° C. or higher, in embodiments where step (b) is carried out in a separate stage of the fluidized bed or a separate fluidized bed reactor.

Chemically inert particulate materials in the context of this special embodiment of the present invention refers to materials that do not undergo a chemical reaction with any of the lithium salt, the respective precursor and the respective cathode active material of the respective embodiment. Preferred are ceramics such as, but not limited to alumina, yttrium oxide, zirconia, and combinations of at least two of the foregoing, and particularly preferred are alumina, yttrium oxide and zirconia. Most preferred are alumina in alpha alumina phase (corundum) and zirconia.

Such chemically inert material is particulate, that is, in the form of particles, even during step (c). The melting point of such chemically inert particulate material is thus higher than the temperature at which step (c) is carried out. Such particles may be spheroidal. The average diameter of such chemically inert particulate material may be the same as the average diameter of the precursor but is preferably significantly greater or significantly smaller than the average diameter of the precursor, with average diameters significantly greater being more preferred. For example, the inert material may have an average particle size (d50) of at least 20 μm. Particle sizes of 35 microns μm to 500 μm are possible, preferred are 45 to 150 μm.

In one embodiment of the present invention, the weight ratio of chemically inert particulate material to the sum of precursor and lithium salt and, if applicable, cathode active material formed during step (b), at the beginning of step (c) is in the range of from 20:1 to 1:20, preferably 10:1 to 1.5:1, even more preferably 5:1 to 2:1.

In embodiments wherein a chemically inert particulate material is used it is preferred to remove such chemically inert particulate material from the cathode active material at the end of step (c) or preferably after step (c), for example by sieving.

Such chemically inert particulate material may allow for a more stable fluidization. Without wishing to be bound to any theory, it may be assumed that addition of a chemically inert particulate material reduces the number of contacts of potentially sticky precursor particles. Essentially, no sintering between precursor—or cathode active material—and chemically inert particulate material can be observed.

By the inventive process, a lithiated transition metal oxide is being formed that is excellently suitable for electrodes for lithium ion batteries. It does not only have an excellent morphology. Preferably, such lithiated transition metal oxide has a low iron content due to the low corrosion and erosion stress during step (c). In one embodiment of the present invention, the iron content of the lithiated transition metal oxide is in the range of from 1 to 75 ppm, preferably up to 50 ppm. In a preferred embodiment, the iron content of the lithiated transition metal oxide is up to 50 ppm higher than the iron content of the respective precursor.

The invention is further illustrated by working examples.

The following tubular reactor systems are used. The tubular reactors have multiple distributor plates with standpipes.

EXPLANATIONS OF TERMS

RS: reactor system
$Nm^3$: norm cubic meter, thus, at ambient temperature and atmospheric pressure Settled bed height: entire height of the settled bed as if transferred into an empty cylinder with the same cross-section
Ratio fluidized bed height/settled bed height
Height between bed and stage: distance between upper level of respective stage of fluidized bed and a perforated plate of the next stage I. Synthesis of a Lithium Transition Metal Oxide with a Layered Structure

TABLE 1

Parameters of tubular reactors for carrying out the examples

|  | RS.1 | RS.2 | RS.3 | RS.4 | RS.5 |
|---|---|---|---|---|---|
| cross-sectional area [m$^2$] | 0.196 | 0.196 | 0.283 | 0.442 | 0.00811 |
| reactor total height [m] | 17.0 | 17.0 | 11.8 | 7.5 | 3 |
| ratio height/diameter per stage | 1.0 | 1.5 | 0.83 | 0.67 | 29.5 |
| settled bed height per stage [m] | 0.5 | 0.75 | 0.5 | 0.3 | 0.38 |
| expansion factor of fluidized bed height | 1.1 | 1.1 | 1.1 | 1.1 | 1.1 |
| fluidized bed height per stage [m] | 0.55 | 0.825 | 0.55 | 0.33 | 0.42 |
| Number of stages | 34 | 23 | 24 | 26 | 1 |
| Number of stages for step (c), ±1 | 17 | 11 | 12 | 13 | 1 |
| Solids residence time per stage [min] | 14.1 | 20.9 | 20.0 | 18.5 | 240 |
| Volumetric gas flow [Nm$^3$/h] | 50 | 50 | 75 | 75 | 3.35 |
| superficial gas flow at 25° C. [cm/s] | 7 | 7 | 7 | 5 | 11.5 |
| superficial gas flow at 925° C. [cm/s] | 28 | 28 | 30 | 19 | 13.4 |
| mass flow of gas [kg/h] | 58.4 | 58.4 | 87.6 | 87.6 | 96 |
| height between bed and stage [m] | 0.2 | 0.2 | 0.2 | 0.2 | n/a |
| Total height of reactor system [m] | 25.3 | 23.4 | 17.8 | 13.6 | 5 | n/a: not applicable.

Step (a.1):

In such a reactor, a precursor of formula $Ni_{0.33}Co_{0.33}Mn_{0.33}(OH)_2$, average particle diameter 12 μm, is mixed with 1.12 equivalents of $Li_2CO_3$, average particle diameter 5.5 μm, equivalents of Li referring to total transition metal content of said precursor.

Step (b.1): the mixture obtained in step (a.1) is pre-calcined at a temperature of 675° C.

Then, step (c.1) is begun in a fluidized bed reactor with distributor plates and standpipes made from high density alumina and alumina shielded reactor inner walls. The gas inlet temperature is 25° C., the maximum temperature of the gas is 925° C. The heat is reached by electrical heating of the walls. The required heat flow to heat up the solids from 25° C. to 925° C. is approximately 166.7 kW. In this example, the required heat flow is only partially provided by external heat introduction and the main amount of the heat is transferred by the gas to the particles (heat recovery). The respective step (c.1) to (c.4) is performed at 50% of the stages, the other stages serve for heating of the particles of the precursor to the desired temperature or cooling them down to ambient temperature.

A cathode active material of the formula $Li_{1.06}(Ni_{0.33}Co_{0.33}Mn_{0.33})_{0.94}O_2$ was obtained. The iron content was less than 75 ppm.

II. Synthesis of a Lithiated Ni—Co—Al Oxide (a.II) In reactor system RS.1, a mixture of LiOH, $Al_2(OH)_3$, and a precursor of formula $Ni_{0.84}Co_{0.16}(OH)_2$ are mixed in such way that the final nickel cobalt aluminum cathode material has a lithium to metal ratio of 1.02, with metals in this context being nickel, cobalt, and aluminum. The amount of aluminum hydroxide is defined by the ratio of atoms in the final lithiated nickel cobalt aluminum layered oxide, which is $Ni_{0.81}Co_{0.15}Al_{0.04}$.

(b.II) The mixture obtained in step (a.II) is pre-calcined at a temperature of 400° C. for 4 hours followed by pre-calcination at 675° C. for 6 hours. Both pre-calcination dwells are conducted in oxygen atmosphere.

(c.II) The system for calcination is the same as described in (c.1). Calcination is conducted in oxygen atmosphere. The material temperature in the highest temperature zone is 780° C. The residence time of the material in the highest temperature zone is 6 hours.

A cathode active material of the formula $Li_{1.01}(Ni_{0.81}Co_{0.15}Al_{0.04})_{0.99}O_2$ is obtained. The iron content is less than 75 ppm.

III. Synthesis of a Lithiated Spinel (a.III) In reactor system RS.1, $Li_2CO_3$ is mixed with spinel precursor of formula $Ni_{0.5}Mn_{1.5}(OH)_4$ in such way that the lithium to transition metal ratio is 1.01.

(b.III) The obtained mixture is pre-calcined at 375° C. for 3 hours and at 650° C. for 6 hours, both in an atmosphere of air.

(c.III) The calcination of the material is conducted in the same system as described in (c.1). The calcination is run in air. The calcination is run in such way that the material is treated at 820° C. for 6 hours with 820° C. being the highest temperature the material reaches in the course of the calcination.

A cathode active material of the formula $Li_{1.01}(Ni_{0.5}Mn_{1.5})_{0.99}O_2$ is obtained. The iron content is less than 75 ppm.

IV. Synthesis of a Lithium Transition Metal Oxide with a Layered Structure in the Presence of a Chemically Inert Particulate Material Aluminum Oxide White from AGSCO Corporation was used as chemically inert particulate material. The crystal form was α-alumina, the chemical nature was amphoteric, the particle density was 3.95 g/cm$^3$, the loose back bulk density was 1.61-1.87 g/cm$^3$, the Mohs hardness was 9, the melting point 2000° C. The particle size distribution was measured with a Horiba Particle Size Distribution Analyzer LA-950 V2. The average particle diameter of the chemically inert particulate material was 52.3 μm.

Steps (a.1) and (a.2) were repeated as above. Before charging the reactor system RS.5, however, an amount of the above aluminum oxide white was added to the precalcined mixture obtained from step (b.1) so that the weight ratio of aluminum oxide white to precursor was 7:3. The precalcined mixture was filled into a glass vessel cold flow fluidized bed system first, the alumina then was also filled into the same vessel. Mixing was performed by fluidizing the vessel load for one minute. Quality of the mixture was determined visually. The mixture so obtained was then filled into reactor system RS.5. The fluidization was performed in accordance with Table 1 as a batch operation, maintaining a bed temperature of 925° C. for 2 hours.

A cathode active material of the formula $Li_{1.06}(Ni_{0.33}Co_{0.33}Mn_{0.33})_{0.94}O_2$ was obtained. The iron content was less than 75 ppm.

The invention claimed is:

1. A process for manufacturing a lithiated transition metal oxide, the process comprising:
   (a) mixing at least one lithium salt and a precursor selected from the group consisting of transition metal oxides, transition metal oxyhydroxides, transition metal hydroxides, and transition metal carbonates;
   (b) pre-calcining the mixture obtained in step (a) at a temperature in the range of from 300 to 700° C.; and
   (c) calcining the pre-calcined mixture according to step (b) in a multi-stage fluidized bed reactor at a temperature in the range of from 550° C. to 950° C.,
   wherein the temperatures in step (b) and (c) are selected such that step (c) is performed at a temperature higher than that of step (b).

2. The process according to claim 1, wherein step (b) is performed in a rotary kiln, rotary hearth kiln, pendulum kiln, roller hearth kiln, tunnel kiln, packed bed reactor, fluidized bed reactor, or in a separate stage of a fluidized bed.

3. The process according to claim 1, wherein step (b) is performed in a separate stage of the multi-stage fluidized bed reactor in which step (c) is performed, wherein said separate stage has the same as or a larger hold-up than the stages of said multi-stage fluidized bed reactor in which step (c) is performed.

4. The process according to claim 1, wherein the precursor has an average particle diameter (D50) in the range of from 3 to 20 μm.

5. The process according to claim 1, wherein said precursor contains the cations of at least two transition metals selected from nickel, cobalt, and manganese.

6. The process according to claim 1, wherein the heat in step (c) is at least partially transferred by thermal radiation.

7. The process according to claim 1, wherein step (c) is performed in a multi-stage fluidized bed with in the range of from 3 to 20 stages.

8. The process according to claim 1, wherein different stages of the reactor wherein step (c) is performed are separated from each other through physical provisions.

9. The process according to claim 8, wherein the different stages of the reactor wherein step (c) is performed are connected with each other through standpipes.

10. The process according to claim 1, wherein the apparatus wherein step (c) is being performed has a surface made from ceramic material.

11. The process according to claim 1, wherein the lithiated transition metal oxide is selected from the group consisting of lithiated spinels, layered oxides, and lithium nickel-cobalt-aluminum oxides.

12. The process according to claim 1, wherein the iron content of the lithiated transition metal oxide is in the range of from 1 to 75 ppm.

13. The process according to claim 1, wherein the at least one lithium salt is selected from the group consisting of lithium hydroxide, lithium oxide, and lithium carbonate.

14. The process according to claim 1, wherein the precursor is selected from the group consisting of mixed transition metal oxides, mixed transition metal oxyhydroxides, mixed transition metal hydroxides, and mixed transition metal carbonates of at least two transition metals.

15. The process according to claim 1, wherein step (c) is carried out in the presence of a chemically inert particulate material.

* * * * *